(12) United States Patent
Tang

(10) Patent No.: US 9,380,147 B2
(45) Date of Patent: Jun. 28, 2016

(54) METHOD AND DEVICE FOR UNLOCKING MOBILE TERMINAL

(71) Applicant: Baidu Online Network Technology (Beijing) Co., Ltd, Beijing (CN)

(72) Inventor: Honggang Tang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/411,905

(22) PCT Filed: Dec. 10, 2012

(86) PCT No.: PCT/CN2012/086298
§ 371 (c)(1),
(2) Date: Dec. 29, 2014

(87) PCT Pub. No.: WO2014/048037
PCT Pub. Date: Apr. 3, 2014

(65) Prior Publication Data
US 2015/0207921 A1    Jul. 23, 2015

(30) Foreign Application Priority Data

Sep. 25, 2012   (CN) .......................... 2012 1 0362938

(51) Int. Cl.
| | | |
|---|---|---|
| *H04M 1/72* | (2006.01) | |
| *H04M 1/725* | (2006.01) | |
| *G06F 3/0488* | (2013.01) | |
| *G06F 21/36* | (2013.01) | |
| *H04M 1/67* | (2006.01) | |

(52) U.S. Cl.
CPC ......... *H04M 1/72577* (2013.01); *G06F 3/0488* (2013.01); *G06F 21/36* (2013.01); *H04M 1/67* (2013.01); *H04M 1/72561* (2013.01)

(58) Field of Classification Search
None
See application file for complete search history.

(56) References Cited

U.S. PATENT DOCUMENTS

| | | | |
|---|---|---|---|
| 8,468,244 B2 * | 6/2013 | Redlich ................. | G06Q 10/06 705/50 |
| 2005/0138110 A1 * | 6/2005 | Redlich ............ | C07K 14/70575 709/201 |
| 2009/0006991 A1 | 1/2009 | Lindberg et al. | |
| 2009/0228825 A1 * | 9/2009 | Van Os ................. | G06F 3/0488 715/780 |
| 2009/0241072 A1 | 9/2009 | Chaudhri et al. | |
| 2012/0311478 A1 * | 12/2012 | Van Os ................. | G06F 3/0488 715/780 |

FOREIGN PATENT DOCUMENTS

| | | |
|---|---|---|
| CN | 102281143 A | 12/2011 |
| CN | 102542018 A | 7/2012 |
| WO | 2012/093784 | 7/2012 |

OTHER PUBLICATIONS

CN, International Search Report, PCT/CN2012/086298, Jul. 4, 2013.

* cited by examiner

*Primary Examiner* — Diane Mizrahi
(74) *Attorney, Agent, or Firm* — Orrick, Herrington & Sutcliffe LLP

(57) ABSTRACT

A method and apparatus for unlocking a mobile terminal. The method comprises acquiring file names of a plurality of user files on an online hard drive; a mobile terminal placing the file names and a search box on a lock-screen page of the mobile terminal; the mobile terminal determining whether to unlock the mobile terminal based on the user's operation on one file name among the plurality of file names and the search box; and if so, the mobile terminal performing unlocking and opening a file corresponding to the file name on the online hard drive. The present invention enables users to implement functions such as unlocking of a mobile terminal and opening of an online hard drive file, which require several complicated operations in the prior art, through simple operations such as dragging, thereby saving users' time and enhancing user experience.

20 Claims, 2 Drawing Sheets

METHOD AND DEVICE FOR UNLOCKING MOBILE TERMINAL

CROSS-REFERENCE TO RELATED APPLICATIONS

This application is a national stage filing of International Patent Application No. PCT/CN2012/086298, filed on Dec. 10, 2012, which claims priority to Chinese Patent Application No. CN201210362938.9, filed on Sep. 25, 2012, the contents of which are incorporated herein by reference in their entireties and for all purposes.

TECHNICAL FIELD

The present invention relates to mobile terminal processing technologies, and in particular to a method and apparatus for unlocking a mobile terminal.

BACKGROUND

Mobile terminals (including movable devices such as mobile phones and tablet computers) have increasingly become an indispensable part of people's lives, and they provide people with various different applications, and greatly facilitate people's daily life. The existing mobile terminals generally provide a function of screen locking in order to prevent erroneous operations of the device by people during use, that is, the screen of a mobile terminal which is not operated within a certain length of time is locked.

If the existing mobile device is in a locked state, in the case of wanting to use data in an online hard drive, the following operations must be performed sequentially: firstly, unlocking a screen, then executing an application menu to start an online hard drive application program, and then searching for a desired file after the online hard drive program is executed, and opening the file after it is found. Thus, a network file can only be opened by means of four steps of operations. The operation process is long, and the operations are complicated. Obviously, such a complicated unlocking method causes inconvenience to a user. Therefore, an unlocking method for quickly unlocking a mobile terminal and running an executable application simultaneously is required.

SUMMARY

The present invention is intended to at least solve one of the above-mentioned technical problems to some extent or at least provide a useful commercial choice. The present invention provides a method for unlocking a mobile terminal and a mobile terminal to achieve the objects of quickly unlocking a mobile terminal and opening a file in an online hard drive simultaneously.

In order to achieve the above-mentioned object, one aspect of the present invention proposes a method for unlocking a mobile terminal, comprising the following steps: a mobile terminal acquiring file names of a plurality of files of a user on an online hard drive; the mobile terminal placing the file names of the plurality of files and a search box on a lock-screen page of the mobile terminal; the mobile terminal determining whether to perform unlocking based on the user's operation on one file name among the plurality of file names and the search box; and if so, the mobile terminal performing unlocking and opening a file corresponding to the one file name on the online hard drive based on the one file name.

By means of the method for unlocking a mobile terminal according to the embodiments of the present invention, a user may implement functions such as unlocking of a mobile terminal and opening of an online hard drive file, which require several complicated operations in the prior art, through simple operations such as dragging, thereby saving users' time and enhancing user experience. Meanwhile, since a triggering condition for unlocking and opening an online hard drive file is a valid gesture command of a user, with respect to the traditional keyboard unlocking or screen-touch unlocking, this method can better reflect the real intention of the user in performing an operation and reduce the possibility of erroneous operation of the device by the user.

In one embodiment of the present invention, the method for unlocking a mobile terminal further comprises: the mobile terminal arranging the file names of the plurality of files at distances from the search box from close to remote according to a descending order of access frequencies of the file names of the plurality of files.

In one embodiment of the present invention, the method for unlocking a mobile terminal further comprises: the mobile terminal arranging fonts of the plurality of file names from big to small according to a descending order of access frequencies of the file names of the plurality of files.

In one embodiment of the present invention, the step of the mobile terminal determining whether to unlock the mobile terminal based on the user's operation on one file name among the plurality of file names and on the search box further comprises: the mobile terminal identifying the operation to obtain an identification result; and the mobile terminal judging whether the identification result is a valid operation, if so, the mobile terminal performing unlocking and opening a file corresponding to the one file name on the online hard drive based on the one file name, and if not, not responding to the operation.

In one embodiment of the present invention, the valid operation is dragging the one file name into the search box.

In one embodiment of the present invention, a file thumbnail corresponding to the one file name is displayed in the process of dragging.

Another aspect of the present invention proposes an apparatus for unlocking a mobile terminal, comprising: an acquisition module, the acquisition module being used for acquiring file names of a plurality of files of a user on an online hard drive; a first arrangement module, the first arrangement module being used for placing the file names of the plurality of files and a search box on a lock-screen page of the mobile terminal; an unlocking judgment module, the unlocking judgment module being used for determining whether to unlock the mobile terminal based on the user's operation on one file name among the plurality of file names and the search box; and an execution module, the execution module being used for unlocking the mobile terminal and opening a file corresponding to the one file name on the online hard drive based on the one file name when the unlocking judgment module judges that the mobile terminal is to be unlocked.

By means of the apparatus for unlocking a mobile terminal according to the embodiments of the present invention, a user may implement functions such as unlocking of a mobile terminal and opening of an online hard drive file, which require several complicated operations in the prior art, through simple operations such as dragging, thereby saving users' time and enhancing user experience. Meanwhile, since a triggering condition for unlocking and opening an online hard drive file is a valid gesture command of a user, with respect to the traditional keyboard unlocking or screen-touch unlocking, this method can better reflect the real intention of the user in performing an operation and reduce the possibility of erroneous operation of the device by the user.

In one embodiment of the present invention, the apparatus for unlocking a mobile terminal further comprises: a second arrangement module, the second arrangement module being used for arranging the file names of the plurality of files at distances from the search box from close to remote according to a descending order of access frequencies of the file names of the plurality of files.

In one embodiment of the present invention, the apparatus for unlocking a mobile terminal further comprises: a third arrangement module, the third arrangement module being used for arranging fonts of the plurality of file names from big to small according to a descending order of access frequencies of the file names of the plurality of files.

In one embodiment of the present invention, the apparatus for unlocking a mobile terminal further comprises: a fourth arrangement module, the fourth arrangement module being used for displaying the file names of the plurality of files in different colors.

In one embodiment of the present invention, the unlocking judgment module is further used for: identifying the operation to obtain an identification result; and judging whether the identification result is a valid operation, if so, unlocking the mobile terminal and opening a file corresponding to the one file name on the online hard drive based on the one file name, and if not, not responding to the operation.

In one embodiment of the present invention, the valid operation is dragging the one file name into the search box.

Some of the additional aspects and advantages of the present invention will be given in the description below, and some will become apparent from the following description, or can be learned by implementing the present invention.

BRIEF DESCRIPTION OF THE DRAWINGS

The above-mentioned and/or additional aspects and advantages of the present invention will become apparent and easily understood from the following description of the embodiments in conjunction with the accompanying drawings, in which.

DETAILED DESCRIPTION OF THE PREFERRED EMBODIMENTS

In order to make the objects, technical solutions and advantages of the present invention clearer, the present invention is described in detail hereinbelow in conjunction with the accompanying drawings and specific embodiments.

It should be noted that the terms "first" and "second" are merely for description purposes, rather than being understood to indicate or imply relative importance or implicitly specify the number of technical features indicated. Thus, the feature defined by "first" and "second" may explicitly or implicitly comprise one or more of the feature. Furthermore, in the description of the present invention, unless otherwise specified, the meaning of "more" is two or more than two.

Figure 1:
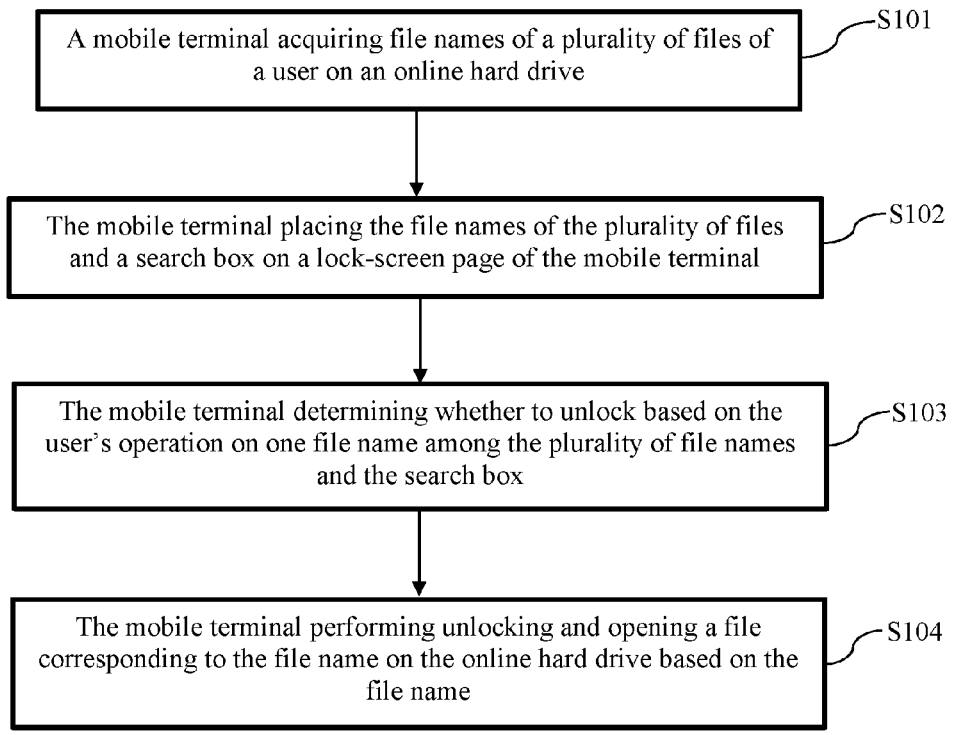
FIG. 1 a flowchart of a method for unlocking a mobile terminal of the embodiments of the present invention.

Referring to FIG. 1, FIG. 1 is a schematic flowchart of a method for unlocking a mobile terminal of the preferred embodiments of the present invention. As shown in FIG. 1, the method comprises the following steps:

S101: a mobile terminal acquires file names of a plurality of files of a user on an online hard drive.

S102: the mobile terminal places the file names of the plurality of files and a search box on a lock-screen page of the mobile terminal.

S103: the mobile terminal determines whether to unlock same based on the user's operation on one file name among the plurality of file names and the search box, and if so, then S104 is executed.

S104: the mobile terminal performs unlocking and opens a file corresponding to the file name on the online hard drive based on the file name.

The above-mentioned method is described below by means of specific embodiments.

In one embodiment of the present invention, in step S101, an online hard drive storing files may be determined according to a configuration of the mobile terminal by the user, and file names of a plurality of files on the online hard drive are acquired. The online hard drive may be online hard drives such as a Baidu online hard drive, Huawei online hard drive, etc. which support the user to log in on his/her own account to read files by means of the mobile terminal.

Figure 2:
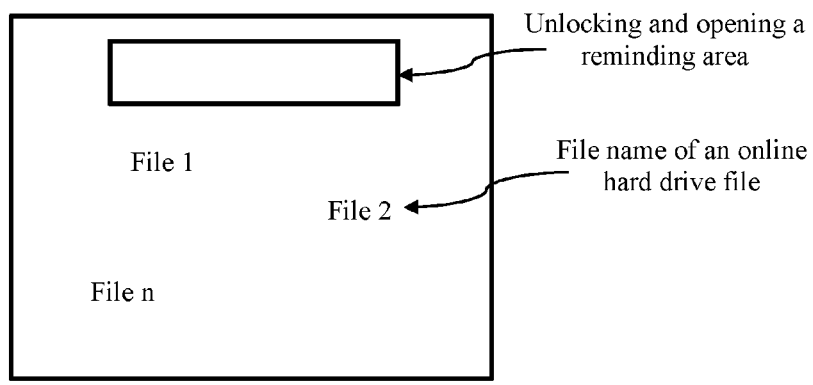
FIG. 2 is a schematic layout diagram of an unlocking interface of a mobile terminal of one embodiment of the present invention.

After a plurality of file names are acquired, in step S102, layout is performed on a lock-screen page of the mobile terminal, and the file names of the plurality of files and a search box are placed on the lock-screen page of the mobile terminal. The mobile terminal displays two main features on a page in a locked state, one is an area for prompting a user to perform unlocking, and the other area is aggregated files from the online hard drive. In an online hard drive file area, the layout of the file names may take various forms, comprising but not merely limited to the following three:

1) The file names of the plurality of files are arranged at distances from the search box from close to remote according to a descending order of access frequencies of the file names of the plurality of files, as shown in FIG. 2, in which file 1 is a program having the highest user access frequency, and thus is the closest to the search box in terms of layout.

2) Fonts of the plurality of file names are arranged from big to small according to a descending order of access frequencies of the file names of the plurality of files.

3) The file names of the plurality of files are displayed in different colors.

By means of the above forms of layout, files frequently used by a user may be selected by the user more easily, and files with the same name under different file folders may be distinguished, so as to enhance user experience. When the user drags a file to an unlocking area and releases same, a system carries out an unlocking action, and further executes an online hard drive program and opens the file which is dragged by the user in the online hard drive program.

Step S103 comprises: the user of the mobile terminal gives a gesture command by touching an icon of an executable application displayed on a screen in a locked state; the mobile terminal identifies the operation to obtain an identification result; the mobile terminal judges whether the identification result is a valid operation, and if so, the mobile terminal performs unlocking and opens a file corresponding to the file name on the online hard drive based on the file name; otherwise, the mobile terminal considers the operation as an erroneous operation of the user, and thus does not respond to the operation. The valid operation can be preset by the system of the mobile terminal. In a specific implementation, the valid operation may be an operation which is not easily triggered by a user unintentionally, such as dragging a file name on a screen into the search box, and may specifically be determined by the user according to a configuration of the mobile terminal.

Figure 3:
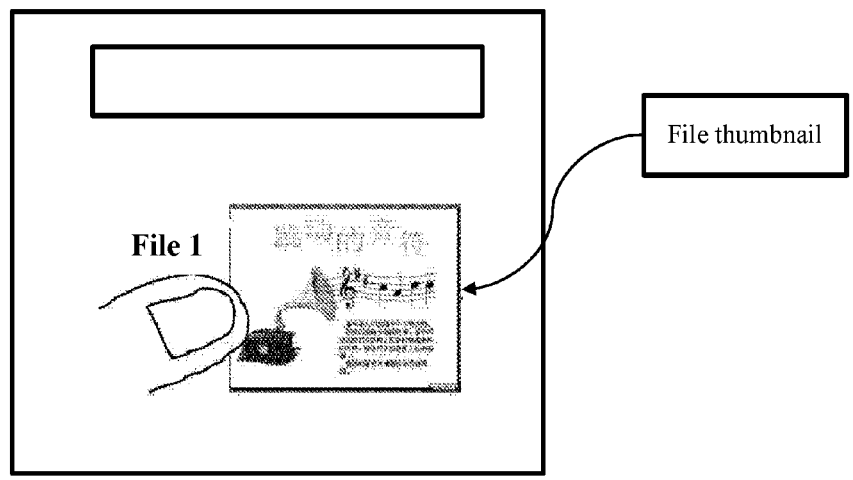
FIG. 3 is a schematic diagram of unlocking a screen by means of a valid gesture of one embodiment of the present invention.

In one embodiment of the present invention, in the process where a user presses on a file name or drags the file name, the mobile terminal generates a file thumbnail corresponding to the file name, as shown in FIG. 3. The user may learn the content of the file by means of the file thumbnail so as to determine whether to unlock same, continues to drag the file to an unlocking area if wanting to unlock, and directly releases the relevant file name to cancel the unlocking process if not wanting to unlock.

By means of the method for unlocking a mobile terminal according to the preferred embodiments of the present invention, a user may implement functions such as unlocking of a mobile terminal and opening of an online hard drive file, which require several complicated operations in the prior art, through simple operations such as dragging, thereby saving users' time and enhancing user experience. Meanwhile, since a triggering condition for unlocking and opening an online hard drive file is a valid gesture command of a user, with respect to the traditional keyboard unlocking or screen-touch unlocking, this method can better reflect the real intention of the user in performing an operation and reduce the possibility of erroneous operation of the device by the user.

Figure 4:
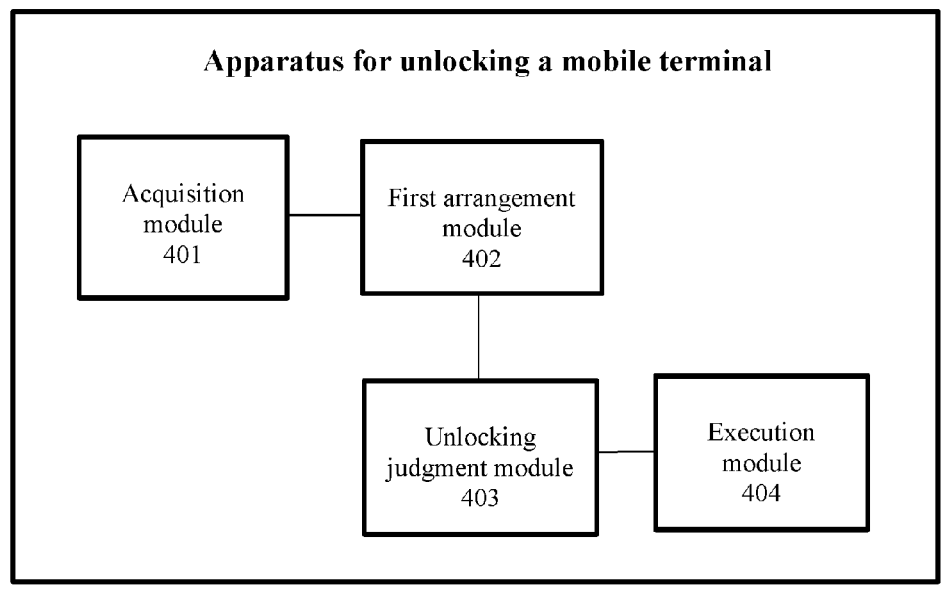
FIG. 4 is a schematic diagram of an apparatus for unlocking a mobile terminal of the embodiments of the present invention.

Referring to FIG. 4, FIG. 4 is a schematic diagram of an apparatus for unlocking a mobile terminal of a second aspect of embodiments of the present invention. As shown in FIG. 4, the apparatus for unlocking a mobile terminal comprises: an acquisition module 401, a first arrangement module 402, an unlocking judgment module 403 and an execution module 404.

The acquisition module 401 is used for acquiring file names of a plurality of files of a user on an online hard drive. The first arrangement module 402 is used for placing the file names of the plurality of files and a search box on a lock-screen page of the mobile terminal. The unlocking judgment module 403 is used for determining whether to unlock the mobile terminal based on the user's operation on one file name among the plurality of file names and the search box. The execution module 404 is used for unlocking the mobile terminal and opening a file corresponding to the file name on the online hard drive based on the file name when the unlocking judgment module 403 judges that the mobile terminal is to be unlocked.

In one embodiment of the present invention, the apparatus for unlocking a mobile terminal further comprises a second layout module, a third layout module and a fourth layout module. The second arrangement module is used for arranging file names of the plurality of files at distances from the search box from close to remote according to a descending order of access frequencies of the file names of the plurality of files. The third arrangement module is used for arranging fonts of the plurality of file names from big to small according to a descending order of access frequencies of the file names of the plurality of files. The fourth arrangement module is used for displaying the file names of the plurality of files in different colors. The specific layout may be set by the user so as to determine which module or which modules of the various arrangement modules is/are to take effect.

After the user performs operations such as a gesture on the touch screen, the unlocking judgment module 403 identifies the operation to obtain an identification result, and judges whether the identification result is a valid operation; if so, the mobile terminal is unlocked and a file corresponding to the file name on the online hard drive is opened based on the file name; and if not, the operation is not responded to. In a specific implementation, the valid operation may be an operation which is not easily triggered by a user unintentionally, such as dragging a file name on a screen into the search box, and may specifically be determined by the user according to a configuration of the mobile terminal.

In one embodiment of the present invention, in the process where a user presses on a file name or drags the file name, the unlocking judgment module 403 generates a file thumbnail corresponding to the file name to display to the user, as shown in FIG. 3. The user may learn the content of the file by means of the file thumbnail so as to determine whether to unlock same, continues to drag the file to an unlocking area if wanting to unlock, and directly releases the relevant file name to cancel the unlocking process if not wanting to unlock.

By means of the apparatus for unlocking a mobile terminal according to the embodiments of the present invention, a user may implement functions such as unlocking of a mobile terminal and opening of an online hard drive file, which require several complicated operations in the prior art, through simple operations such as dragging, thereby saving users' time and enhancing user experience. Meanwhile, since a triggering condition for unlocking and opening an online hard drive file is a valid gesture command of a user, with respect to the traditional keyboard unlocking or screen-touch unlocking, this method can better reflect the real intention of the user in performing an operation and reduce the possibility of erroneous operation of the device by the user.

Any process or method description in the flowchart or otherwise described herein may be understood to represent a module, segment or section comprising one or more codes of executable instructions used for implementing a particular logical function or process step, and the scope of the preferred embodiments of the present invention comprises further implementations, where functions may be carried out not according to the order shown or discussed, including in a basically synchronous manner or an inverse order in accordance with the functions involved, and this should be understood by those skilled in the art to which the embodiments of the present invention belong.

Logic and/or steps represented in the flowchart or otherwise described herein, for example, may be considered as a sequencing list of executable instructions used for implementing a logical function, may specifically be implemented in any computer readable medium for an instruction execution system, apparatus or device (such as a computer-based system, a system comprising a processor or other systems which may extract an instruction from the instruction execution system, apparatus or device and execute the instruction) to use, or is used in combination with these instruction execution systems, apparatuses or devices. For this description, the "computer readable medium" may be any apparatus which may contain, store, communicate, propagate or transmit a program for an instruction execution system, apparatus or device to use or to be used in combination with these instruction execution systems, apparatuses or devices. More specific examples of the computer readable medium (a non-exhaustive list) comprise the following: an electrical connection part (an electronic apparatus) having one or more wirings, a portable computer disk box (a magnetic apparatus), a random access memory (RAM), a read-only memory (ROM), an erasable and programmable read-only memory (an EPROM or flash memory), an optical fiber apparatus, and a portable CD read-only memory (CDROM). In addition, the computer readable medium may even be paper or other appropriate media upon which the program can be printed, because for example, paper or other media may be subjected to optical scanning, then processed by means of editing, interpreting or other appropriate means if necessary, to obtain the program in an electronic manner, and then the program can be stored in a computer memory.

It should be understood that various parts of the present invention may be implemented by means of hardware, software, firmware or a combination thereof. In the embodiments above, a plurality of steps or methods may be implemented by means of software or firmware stored in a memory and executed by an appropriate instruction execution system. For example, if implemented by means of hardware, as in another embodiment, they can be implemented by means of any one or a combination of the following techniques commonly known in the art: a discrete logical circuit having a logical gate circuit used for implementing a logical function on a data signal, an application-specific integrated circuit having an appropriate combinational logical gate circuit, a programmable gate array (PGA), a field programmable gate array (FPGA), etc.

Those of ordinary skill in the art shall understand that the implementation of all or a part of the steps carried in the above-mentioned embodiment methods may be achieved by instructing relevant hardware with a program. The program may be stored in a computer readable storage medium, and when executed, the program comprises one of the steps in the method embodiments or a combination thereof.

In addition, various functional units in various embodiments of the present invention may be integrated into a processing module, or each of the units may exist alone physically, or two or more than two units may be integrated into a module. The above-mentioned integrated module may be implemented in the form of hardware, and may also be implemented in the form of a software functional module. When implemented in the form of a software functional module and sold or used as an independent product, the integrated module may also be stored in a computer readable storage medium.

The above-mentioned storage medium may be a read-only memory, a magnetic disk, or an optical disk, etc.

In the description of the specification, the description of the reference terms such as "one embodiment", "some embodiments", "an example", "a specific example" or "some examples" is intended to mean that a particular feature, structure, material or characteristic described in connection with the embodiment or example is included in at least one embodiment or example of the present invention. In the present description, the schematic expression of the above-mentioned terms does not necessarily refer to the same embodiment or example. Furthermore, particular features, structures, materials or characteristics described may be combined in a suitable manner in any one or more embodiments or examples.

Although the embodiments of the present invention have been shown and described, it should be understood by those of ordinary skill in the art that various changes, modifications, replacements and variations can be made to these embodiments without departing from the principle and spirit of the present invention, and the scope of the present invention is defined by the appended claims and equivalents thereof.

What is claimed is:

1. A method for unlocking a locked mobile terminal, comprising:
    acquiring file names of a plurality of files on an online hard drive with the locked mobile terminal;
    presenting the file names of the files and a search box on a lock-screen page;
    determining whether to perform a file unlocking based on a predetermined operation being performed on a selected file name among the plurality of file names and the search box; and
    in response to said determination, performing the file unlocking on a file corresponding with the selected file name; and
    opening the file corresponding with the selected file name.

2. The method of claim 1, further comprising arranging the file names of the files at distances from the search box from close to remote according to a descending order of access frequencies of the file names.

3. The method of claim 1, further comprising arranging fonts of the file names from big to small according to a descending order of access frequencies of the file names.

4. The method of claim 1, further comprising displaying the file names in different colors.

5. The method of claim 1, wherein said determining includes:
    identifying the predetermined operation to obtain an identification result;
    judging whether the identification result is a valid operation;
    initiating said performing the file unlocking and said opening the file based upon a judgment that the identification result is the valid operation; and
    not responding to the predetermined operation based upon a judgment that the identification result is not the valid operation.

6. The method of claim 5, wherein the valid operation is dragging the selected file name into the search box.

7. The method of claim 6, further comprising displaying a file thumbnail corresponding to the selected file name in the process of said dragging.

8. An apparatus for unlocking a mobile terminal, comprising:
    an acquisition module configured to acquire file names of a plurality of files of a user on an online hard drive when the mobile terminal is in a locked state;
    a first arrangement module configured to place the file names of the plurality of files and a search box on a lock-screen page of the mobile terminal;
    an unlocking judgment module configured to determine whether to unlock the mobile terminal based on an operation initiated by the user on one file name among the plurality of file names and the search box; and
    an execution module configured to unlock the mobile terminal and opening a file corresponding to the one file name on the online hard drive based on the one file name when said unlocking judgment module judges that the mobile terminal is to be unlocked.

9. The apparatus of claim 8, further comprising a second arrangement module configured to arrange the file names of the plurality of files at distances from the search box from close to remote according to a descending order of access frequencies of the file names of the plurality of files.

10. The apparatus of claim 8, further comprising a third arrangement module configured to arrange fonts of the plurality of file names from big to small according to a descending order of access frequencies of the file names of the plurality of files.

11. The apparatus of claim 8, further comprising a fourth arrangement module configured to display the file names of the plurality of files in different colors.

12. The apparatus of claim 8, wherein said unlocking judgment module is adapted to identify the operation to obtain an identification result, judging whether the identification result is a valid operation, unlocking the mobile terminal and opening a file corresponding to the one file name on the online hard drive based on the one file name in response to a judgment that the identification result is the valid operation and not responding to the operation in response to a judgment that the identification result is not the valid operation.

13. The apparatus of claim 12, wherein the valid operation is dragging the one file name into the search box.

14. A non-volatile computer storage medium including at least one program for unlocking a mobile terminal when implemented by a processor, comprising:
- acquiring file names of a plurality of files on an online hard drive via the mobile terminal when the mobile terminal is in a locked state;
- presenting the file names of the files and a search box on a lock-screen page of the mobile terminal;
- determining whether to perform a file unlocking based on a predetermined operation being performed on a selected file name among the plurality of file names and the search box; and
- performing the file unlocking on a file corresponding with the selected file name via the mobile terminal in response to a result of execution of said determining; and
- opening the file corresponding with the selected file name via the mobile terminal in response to the result of the execution of said determining.

15. The computer storage medium of claim 14, further comprising arranging the file names of the files at distances from the search box from close to remote according to a descending order of access frequencies of the file names.

16. The computer storage medium of claim 14, further comprising arranging fonts of the file names from big to small according to a descending order of access frequencies of the file names.

17. The computer storage medium of claim 14, further comprising displaying the file names in different colors.

18. The computer storage medium of claim 14, wherein said determining includes:
- identifying the predetermined operation to obtain an identification result; instruction for judging whether the identification result is a valid operation;
- initiating said performing the file unlocking and said opening the file based upon a judgment that the identification result is the valid operation; and
- not responding to the predetermined operation based upon a judgment that the identification result is not the valid operation.

19. The computer storage medium of claim 18, wherein the valid operation is dragging the selected file name into the search box.

20. The computer storage medium of claim 19, further comprising displaying a file thumbnail corresponding to the selected file name in the process of said dragging.

* * * * *